US00RE36465E

United States Patent [19]

Boisture

[11] E Patent Number: Re. 36,465

[45] Reissued Date of Patent: Dec. 28, 1999

[54] FURNACE CLEANING APPARATUS

[75] Inventor: Thomas B. Boisture, Baytown, Tex.

[73] Assignee: C.H. Heist Corp., Clearwater, Fla.

[21] Appl. No.: 08/755,778

[22] Filed: Nov. 22, 1996

Related U.S. Patent Documents

Reissue of:

[64] Patent No.: 5,381,811
Issued: Jan. 17, 1995
Appl. No.: 08/204,583
Filed: Mar. 2, 1994

[51] Int. Cl.[6] ..... B08B 3/02

[52] U.S. Cl. ..... 134/22.1; 134/24; 134/167 R; 134/181; 239/752; 901/1

[58] Field of Search ..... 134/167 R, 181, 134/180, 172, 198, 104.1, 201, 22.1, 22.11, 24; 901/1, 16; 118/302, 323; 239/750, 751, 752, 264

[56] References Cited

U.S. PATENT DOCUMENTS

| | | | |
|---|---|---|---|
| 471,931 | 3/1892 | Young, Jr. . | |
| 661,417 | 11/1900 | Mossman . | |
| 690,878 | 1/1902 | Roan . | |
| 1,549,415 | 8/1925 | Hafer . | |
| 1,628,141 | 5/1927 | Gray . | |
| 1,928,621 | 10/1933 | Frede et al. . | |
| 2,109,075 | 2/1938 | Ruth | 299/67 |
| 2,344,108 | 3/1944 | Roselund | 91/45 |
| 2,497,171 | 2/1950 | Jones et al. | 134/24 |
| 2,710,225 | 6/1955 | Richards | 239/264 |
| 2,945,628 | 7/1960 | Broughton | 239/264 |
| 3,001,534 | 9/1961 | Grant, Jr. | 134/167 |
| 3,101,730 | 8/1963 | Harris et al. | 134/167 |
| 3,225,777 | 12/1965 | Shelton et al. | 134/141 |
| 3,247,969 | 4/1966 | Miller | 210/169 |
| 3,358,935 | 12/1967 | Andersen et al. | 239/589 |
| 3,389,713 | 6/1968 | Pittman | 134/167 |
| 3,440,096 | 4/1969 | Scott | 134/24 |
| 3,461,889 | 8/1969 | Saxonmeyer | 134/43 |
| 3,477,178 | 11/1969 | Hulbert, Jr. | 51/8 |
| 3,541,999 | 11/1970 | Winkin | 122/392 |
| 3,571,985 | 3/1971 | Hulbert, Jr. | 51/319 |
| 3,599,871 | 8/1971 | Ruppel et al. | 239/227 |
| 3,645,452 | 2/1972 | Stoeckel | 239/227 |
| 3,661,124 | 5/1972 | Winkin | 122/392 |
| 3,696,825 | 10/1972 | Guignon et al. | 134/167 R |
| 3,701,341 | 10/1972 | Willis, Jr. | 122/392 |
| 3,741,808 | 6/1973 | Stalker | 134/58 R |
| 3,817,262 | 6/1974 | Caradeur et al. | 134/167 |

(List continued on next page.)

FOREIGN PATENT DOCUMENTS

| | | | |
|---|---|---|---|
| 304178 | 5/1971 | U.S.S.R. | 239/752 |
| 486925 | 10/1975 | U.S.S.R. | 239/752 |
| 650678 | 3/1979 | U.S.S.R. | 134/167 R |

OTHER PUBLICATIONS

Helac Corp., PH Series Planetary Hydraulic Rotary Actuators Catalog, undated, 16 pages.

Helac Corp., Helical Rotary Actuators Catalog, 1987, 20 pages.

Stone Age Waterjet Engineering, Two drawings of Oscillating Cyclone Cleaner, May 6 & 10, 1993.

*Primary Examiner*—Frankie L. Stinson
*Attorney, Agent, or Firm*—Hudak & Shunk Co., L.P.A.; Laura F. Shunk

[57] ABSTRACT

A furnace cleaning apparatus for cleaning a cyclone furnace with a fluid from a fluid source. The furnace cleaning apparatus comprises a beam assembly capable of being pivotably mounted to the cyclone furnace. A rotary actuator is connected to the beam assembly for turning the beam assembly. A trolley is movably mounted to the beam assembly. A chain drive assembly and a drive source for moving the trolley relative to the beam assembly are mounted to the beam assembly. An articulated arm assembly is pivotally connected to the trolley. A rotary actuator is mounted to the articulated arm assembly for pivoting the articulated arm assembly relative to the trolley. A nozzle is connected to a second end of the articulated arm assembly. A fluid conduit connects the nozzle to a fluid source.

29 Claims, 3 Drawing Sheets

U.S. PATENT DOCUMENTS

| | | | |
|---|---|---|---|
| 3,836,434 | 9/1974 | Novy | 201/2 |
| 3,878,857 | 4/1975 | Heibo | 134/167 R |
| 3,895,756 | 7/1975 | Jaeger | 239/227 |
| 3,961,983 | 6/1976 | Crandall et al. | 134/8 |
| 3,973,988 | 8/1976 | McMahan | 134/46 |
| 3,987,963 | 10/1976 | Pacht | 239/124 |
| 4,064,656 | 12/1977 | Zeidler | 51/426 |
| 4,080,761 | 3/1978 | Burns | 51/438 |
| 4,095,305 | 6/1978 | Goodwin | 15/104.1 R |
| 4,135,068 | 1/1979 | Burns | 200/61.85 |
| 4,163,455 | 8/1979 | Hebert et al. | 134/167 R |
| 4,170,192 | 10/1979 | Maddock | 118/306 |
| 4,212,248 | 7/1980 | Maybury | 104/138 G |
| 4,219,976 | 9/1980 | Burack | 51/411 |
| 4,220,170 | 9/1980 | Hebert | 134/167 R |
| 4,244,523 | 1/1981 | Looper | 239/227 |
| 4,256,511 | 3/1981 | Atchison | 134/46 |
| 4,273,076 | 6/1981 | Lahoda et al. | 122/382 |
| 4,276,856 | 7/1981 | Dent et al. | 122/382 |
| 4,301,998 | 11/1981 | Rodway | 266/281 |
| 4,326,317 | 4/1982 | Smith et al. | 15/302 |
| 4,332,062 | 6/1982 | Byrne, Jr. | 24/263 DA |
| 4,341,232 | 7/1982 | Maton | 134/107 |
| 4,354,294 | 10/1982 | Silver | 15/317 |
| 4,407,236 | 10/1983 | Schukei et al. | 122/390 |
| 4,445,465 | 5/1984 | Byrd et al. | 122/392 |
| 4,498,427 | 2/1985 | Todd | 122/379 |
| 4,503,811 | 3/1985 | Hammond | 122/392 |
| 4,522,170 | 6/1985 | Lenk | 123/198 DC |
| 4,527,515 | 7/1985 | Hester, II | 122/392 |
| 4,574,825 | 3/1986 | Haug | 134/167 R |
| 4,603,661 | 8/1986 | Nelson et al. | 122/392 |
| 4,605,028 | 8/1986 | Paseman | 134/167 |
| 4,646,768 | 3/1987 | Tanaka et al. | 134/167 R |
| 4,690,159 | 9/1987 | Vadakin et al. | 134/167 C |
| 4,803,959 | 2/1989 | Sherrick et al. | 122/379 |
| 4,805,650 | 2/1989 | Yasui | 134/57 R |
| 4,859,249 | 8/1989 | Valentini | 134/22.18 |
| 4,938,167 | 7/1990 | Mizuho | 118/713 |
| 4,945,862 | 8/1990 | Vadakin | 122/392 |
| 5,038,810 | 8/1991 | Pacheco et al. | 134/167 C |
| 5,069,172 | 12/1991 | Shirey et al. | 122/382 |
| 5,095,929 | 3/1992 | Harvey | 134/167 R |
| 5,107,873 | 4/1992 | Clinger | 134/56 R |
| 5,113,885 | 5/1992 | Ramsey | 134/167 C |
| 5,172,653 | 12/1992 | Vadakin | 122/392 |
| 5,279,675 | 1/1994 | Verbeek | 134/22.1 |
| 5,293,887 | 3/1994 | Thibodeaux | 134/24 |
| 5,301,702 | 4/1994 | McKinney | 134/167 R |
| 5,352,298 | 10/1994 | Moulder | 134/22.18 |
| 5,392,798 | 2/1995 | Hirose | 134/167 R |
| 5,460,193 | 10/1995 | Levallois | 134/56 R |
| 5,482,063 | 1/1996 | Miura | 145/56 R |
| 5,518,553 | 5/1996 | Moulder | 134/22.18 |

FIG. 4
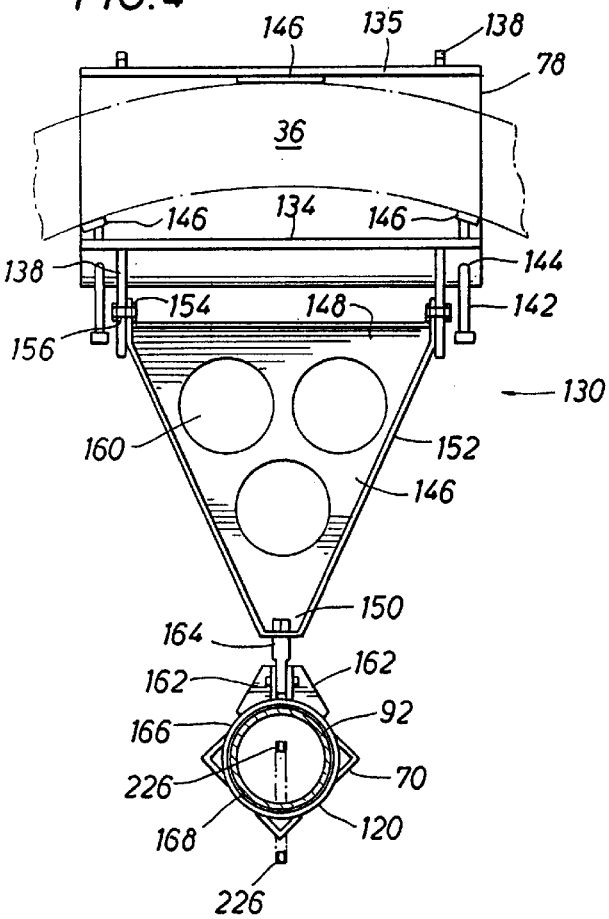
FIG. 5
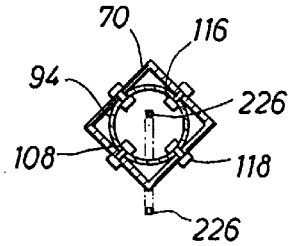
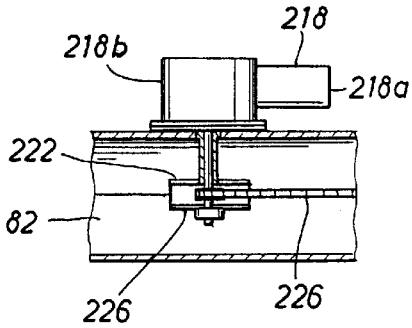
FIG. 6
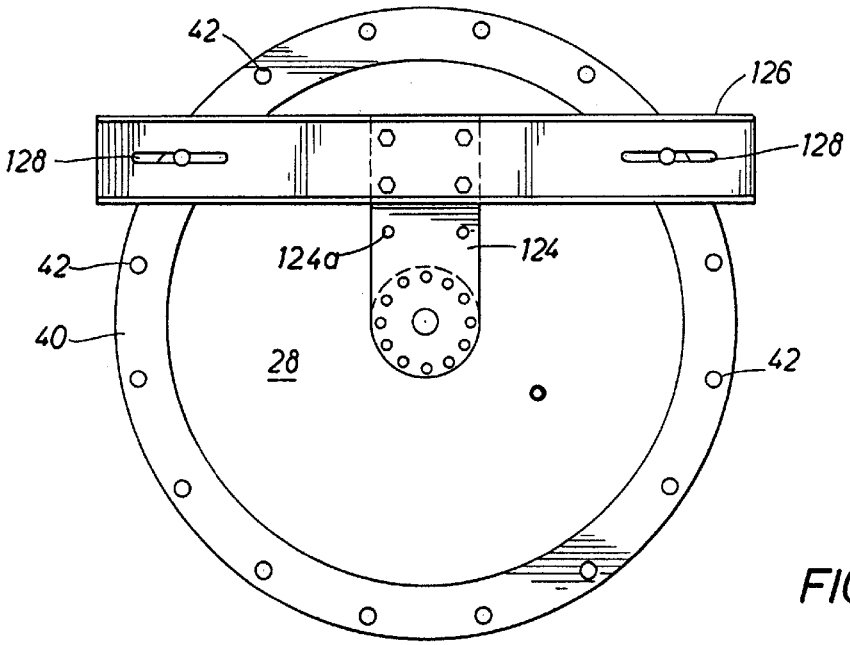
FIG. 7

FURNACE CLEANING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a cleaning apparatus for cleaning the interior surface of a housing such as a cyclone furnace or boiler.

2. Description Of the Prior Art.

Coal fired boilers are commonly used in industry, Pulverized coal is fed into a boiler-through a cyclone burner which receives the pulverized coal from a feeder apparatus connected to the inlet of the cyclone burner. Initial burning of the coal occurs inside the cyclone burner with further burning occurring in the boiler. The boiler is typically a water-cooled horizontal cylinder. Air with a velocity of approximately 300 feet per second is admitted tangentially at the roof of the main barrel of the cyclone furnace and imparts a further whirling or centrifugal action to the coal particles. The combustible is burned at temperatures sufficiently high to melt the ash into a liquid slag, which forms a layer on the interior walls of the cyclone furnace. Incoming coal particles are thrown to the interior walls by centrifugal force and held in the slag. The coal particles are then scrubbed by the high-velocity tangential air.

The interior walls of the cyclone furnace accumulate slag deposits from the burning coal particles. The slag deposits may sometimes be as much as three feet thick. It is well known that some amount of slag is beneficial to the combustion although too much slag is detrimental. Therefore, the interior walls of the cyclone furnace need periodic cleaning to reduce the slag deposits to the desired thickness.

U.S. Pat. No. 4,673,661 to Nelson et al. discloses a semi-automated cyclone furnace cleaning apparatus requiring an operator to enter the cyclone furnace and rearrange or replace high pressure fluid nozzles in order to clean the various inside surfaces of the cyclone furnace.

U.S. Pat. No. 5,107,873 to Clinger discloses an apparatus similar to that described in the '661 patent. The apparatus disclosed in the '661 patent and the '873 patent includes a pair of diametrically opposed lances which are intended to move transversely to the longitudinal axis of the cyclone furnace and includes a nozzle arrangement to provide either a longitudinal spray or a transverse spray normal to the direction of the longitudinal spray.

It is desirable to have a furnace cleaning apparatus which provides maximum versatility in the cleaning operations of the cyclone furnace. It is further desirable to be able to adjust the angle of the fluid spray against the cyclone furnace walls. It is also desirable that the furnace cleaning apparatus be capable of simultaneously moving longitudinally in the cyclone furnace while rotating about the longitudinal axis of the cyclone furnace and further being capable of simultaneous reorientation of the direction of the nozzle spray.

SUMMARY OF THE INVENTION

The present invention is a furnace cleaning apparatus providing maximum versatility in the cleaning operations of a cyclone furnace. The furnace cleaning apparatus is capable of moving longitudinally in the cyclone furnace while oscillating through approximately one revolution about the longitudinal axis thereof and furthermore is capable of simultaneously reorienting the direction of the nozzle spray. The furnace cleaning apparatus is transportable and capable of being assembled within the interior of the cyclone furnace. The apparatus uses high pressure hydroblasting techniques to remove slag deposits from the interior walls of the cyclone furnaces.

The furnace cleaning apparatus includes an oscillating beam assembly capable of being supported by the cyclone furnace. A trolley is movably mounted to the beam assembly and is permitted to move longitudinally relative to the beam assembly. An articulated arm assembly is pivotally connected to the trolley. A nozzle assembly is mounted to the opposite end of the articulated arm assembly. The furnace cleaning apparatus is controlled from an exterior control panel. The direction of the nozzle spray, the configuration of the articulated arm assembly, the axial positioning of the trolley relative to the beam assembly, and the angular rotation of the beam assembly are all controlled from the control panel.

The more important features of this invention have been summarized rather broadly in order that the detailed description may be better understood. There are, of course, additional features of the invention which will be described hereafter and which will also form the subject of the claims appended hereto.

BRIEF DESCRIPTION OF THE DRAWINGS

In order to more fully understand the drawings referred to in the detailed description of the present invention, a detailed description of each drawing is presented, in which:

FIG. 4 is a view taken along line 4—4 of FIG. 1;

FIG. 5 is a view taken along line 5—5 of FIG. 1;

FIG. 6 is a view taken along line 6—6 of FIG. 1; and

FIG. 7 is an end view taken along line 7—7 of FIG. 1.

DETAILED DESCRIPTION OF PREFERRED EMBODIMENT

Figure 1:
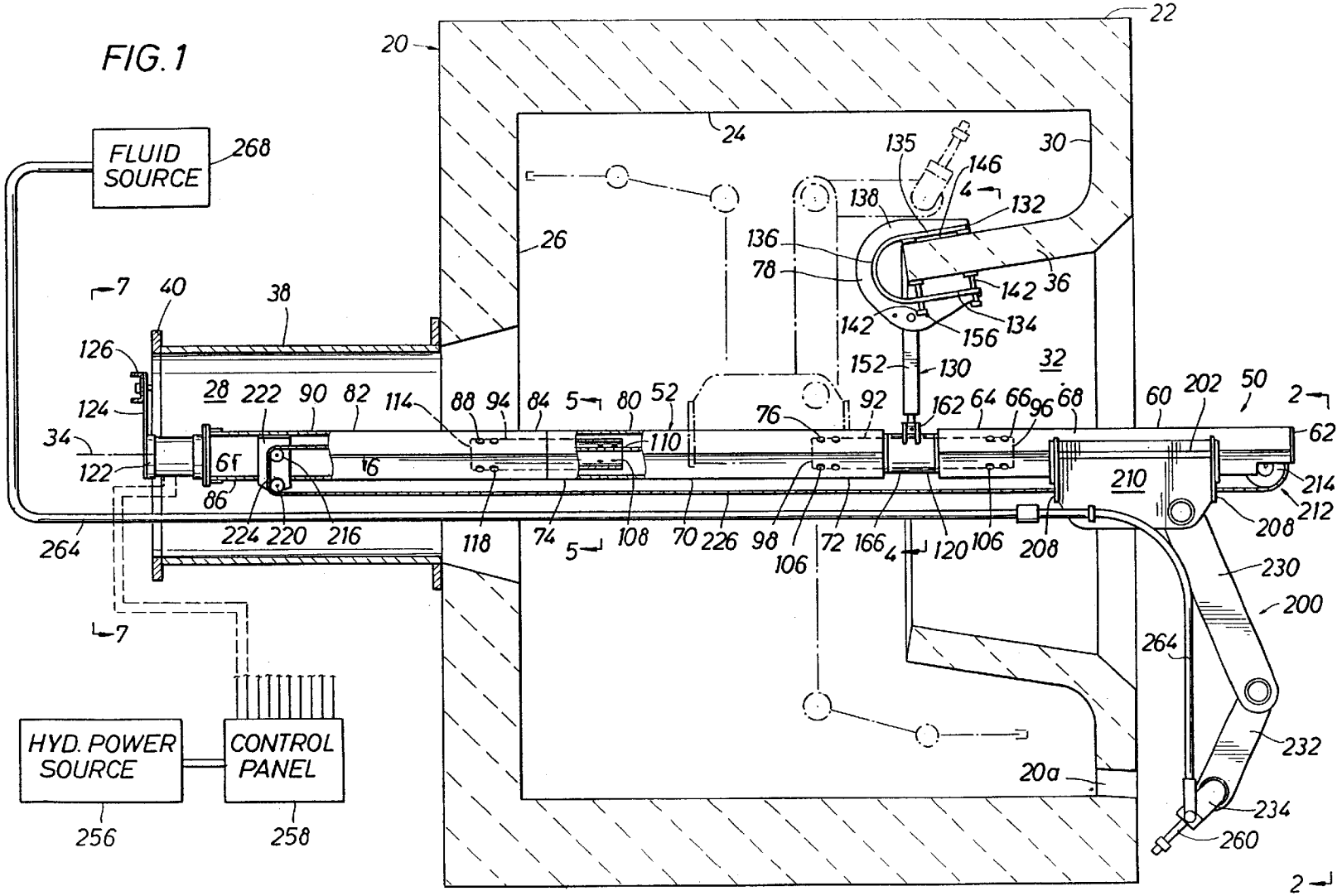
FIG. 1 is a schematic elevational view, partially in section, of the furnace cleaning apparatus of the present invention mounted to a cyclone furnace.

Referring to FIG. 1, a cyclone furnace, designated generally as reference numeral 20, includes a main barrel 22 which is generally cylindrical. Typically, the main barrel 22 of the cyclone furnace 20 has a diameter ranging from 5 to 10 feet. Generally, the cyclone furnace 20 includes a cylindrical sidewall 24, a first end wall 26 having an inlet opening 28, and a second end wall 30 having an outlet opening 32. The inlet and outlet openings 28 and 32, respectively, are generally axially aligned on a longitudinal axis 34 of the cyclone furnace 20. Typically, the outlet opening 32 is defined by an outlet wall 36 extending inwardly into the cyclone furnace 20 in a frustoconical shape as shown in FIG. 1.

Figure 2:
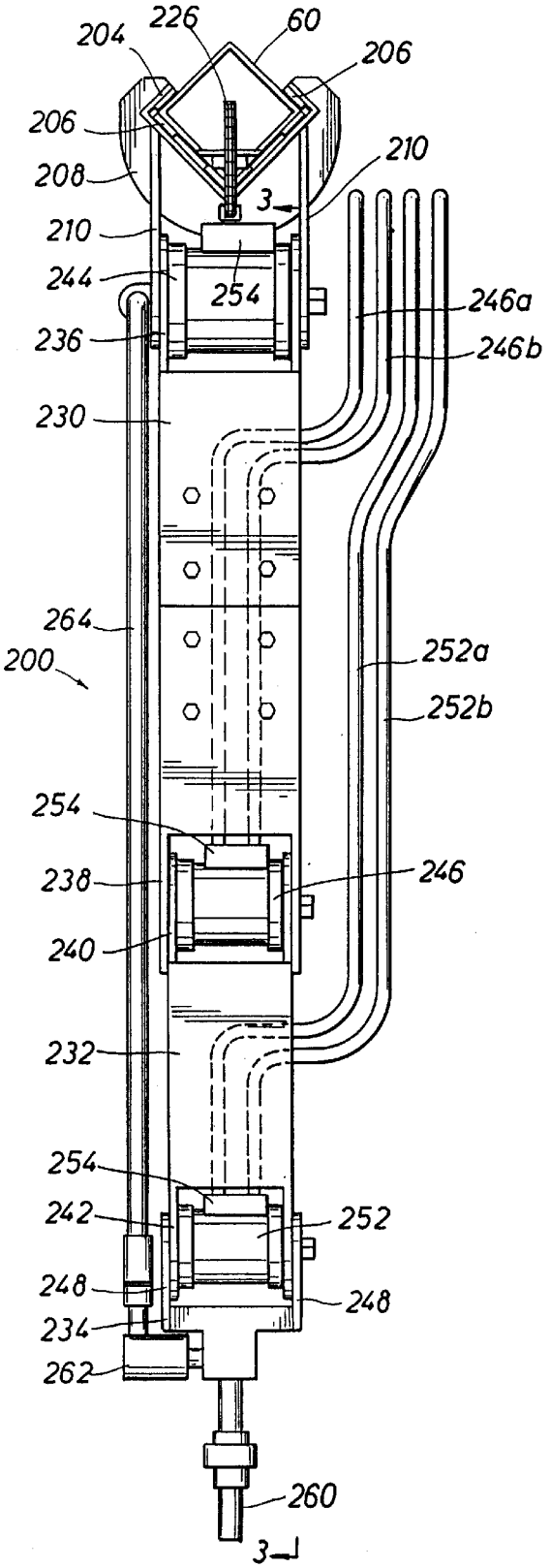
FIG. 2 is an end view taken along line 2—2 of FIG. 1.

Typically, the inlet opening 28 is defined by a substantially cylindrical portion 38 extending outwardly from the main barrel 22 of the cyclone furnace 20 at the first end wall 26. The cylindrical portion 38 typically includes an inlet flange 40 as shown in FIGS. 1 and 2. The inlet flange 40 includes a plurality of equidistantly spaced holes 42 for receiving threaded fasteners to mate with another flange member.

Referring to FIG. 1, the improved furnace cleaning apparatus, designated generally as reference numeral 50, includes a beam assembly 52 comprising a front beam 60, a mid beam 70, and a rear beam 82. The beam assembly 52 is supported by the cyclone furnace 20 at two locations. Preferably, the beam assembly 52 is supported such that a longitudinal axis of the beam assembly 52 substantially coincides with the longitudinal axis 34 of the cyclone furnace 22.

The front beam 60 has a front end 62 and a splice end 64. In the preferred embodiment, the front beam 60 is made of square structural tubing having square corners. The front beam 60 includes a plurality of holes 62 through the wall 68 of the front beam 60.

The mid beam 70 has a cross-section similar to the front beam 60. The mid beam 70 has a splice end 72 and a mid end 74. A plurality of holes 76 extend through the wall 80 near the splice end 72 and mid end 74, respectively, of the mid beam 70.

The rear beam 82 has a mid end 84 and a rear end 86. A plurality of holes 88 extend through the wall 90 of the rear beam 82 near the mid end 84.

Preferably, the front, mid, and rear beams 60, 70, and 82, respectively, are made of aluminum and are square tubing having dimensions of 6"×6"×0.250". However, such members may be of any reasonable dimension suitable for the purpose and may be of various lengths to accommodate the length of the cyclone furnace 20 being cleaned.

As shown in FIG. 1, the front beam 60 is connected to the mid beam 70 with a splice tube 92. The mid beam 70 is connected to the rear beam 82 with a mid tube 94. In the preferred embodiment the splice tube 92 and the mid tube 94 are tubular members of round cross-section capable of close sliding engagement within the front, mid and rear beams 60, 70 and 82, respectively.

Referring to FIG. 1, the mid tube 94 has a mid end 110 and a rear end 114. The mid tube 94 includes a plurality of holes 108 at the mid end 110 and the rear end 114. The plurality of holes 108 at the mid end 110 are adapted to be aligned with the plurality of holes 76 in the mid beam 70. Similarly, the plurality of holes 108 in the rear end 114 of the mid tube 94 are adapted to be aligned with the plurality of holes 88 in the rear beam 82. Preferably, a threaded nut 116 is tack welded to the inside of the mid tube 94 over each of the plurality of holes 108 as shown in FIG. 5. Thus, during the assembly of the beam assembly 52, a plurality of belts 118 can be inserted through the holes in the beam members and the mid tube and threadably engaged with the aligned nuts 116 in the mid tube.

Referring to FIG. 1, the splice tube 92 has a front end 96 and a mid end 98. A plurality of holes (not shown) at the front end 96 are adapted to be aligned with the plurality of holes 66 in the front team 60. Similarly, a plurality of holes (not shown) in the mid end 98 of the splice tube 92 are adapted to be aligned with the plurality of holes 76 in the mid beam 70. Preferably, a threaded nut (not shown) is tack welded to the inside of the splice tube 92 over each of the plurality of holes (not shown). Thus, during the assembly of the beam assembly 52, a plurality of bolts 106 can be inserted through the holes in the beam members and the splice tube and threadably engaged with the aligned nuts (not shown).

As shown in FIG. 1, preferably the mid beam 70 is in generally contacting engagement with the rear beam 82 in the assembled beam assembly 52. The mid tube 94 has a length sufficient to maintain the axial alignment of the mid beam 70 with the rear beam 82. The angular alignment of the beams 70 and 82 is maintained by the bolted connection of the beams 70 and 82 to the mid tube 94. The splice tube 92 maintains the front beam 60 a fixed distance from the mid beam 70. A rotational bearing assembly 120 is mounted on the splice tube 92 between the front and mid beams 60 and 70, respectively. Preferably, the splice tube 92 is a seamless alloy steel tube. The splice tube 92 has a length sufficient to maintain the axial alignment of the mid beam 70 with the front beam 60. The angular alignment of the beams 70 and 60 is maintained by the bolted connection of the beams 70 and 60 to the splice tube 92.

It is important to understand that in the assembled condition, the square tubing beams 60, 70 and 82 of the beam assembly 52 are all angularly and longitudinally aligned for reasons which will be explained below.

As previously mentioned, the beam assembly 52 is supported by the cyclone furnace 20 at two locations, those being a rear location and an intermediate location. A trunnion assembly 122 is attached to the rear end 86 of the rear beam 82 as shown in FIG. 1. The trunnion assembly 122 is further attached to a rear hanger 124. The rear hanger 124 is a plate which is connected to a crossbar 126. The crossbar 126 is preferably a channel member having a pair of openings 128 therethrough. The openings 128 are aligned with a pair of holes 42 in the inlet flange 40 and then bolt connected to the cyclone furnace 20. It may be desirable to make the openings 128 elongated slots so as to enable the crossbar 126 to be used with a variety of inlet flange diameters. It may also be desirable to make the connection between the crossbar 126 and the rear hanger 124 a bolted connection with slots or pairs of holes 124a to enable vertical adjustment of the longitudinal axis of the beam assembly 52 to substantially coincide with the longitudinal axis 34 of the cyclone furnace 20.

Preferably, the trunnion assembly 122 is a rotary actuator as manufactured by Helac Corporation of Enumclaw, Wash. A rotary actuator exerts substantially constant torque through its limited angle of rotation. Preferably, the rotary actuator is hydraulically controlled and includes the feature of direct mounted dual pilot check valves.

The beam assembly 52 is supported at the intermediate location by a clamp 78 and intermediate hanger assembly 130. The clamp 78 includes a generally U-shaped member 132. The U-shaped member 132 includes a lower leg 134 and an upper leg 135 which are joined by a semicircular section 136. A pair of generally U-shaped stiffening plates 138 are secured to the outer surface of the legs 134, 135 and the semicircular section 136. The legs 134, 135 are parallel to one another and are a fixed distance from one another. The fixed distance is sufficient to permit the U-shaped member 132 to be installed onto the outlet wall 36 as shown in FIGS. 1 and 4. Preferably, an upper bearing pad 146 is attached to the lower face of the upper leg 135 along a centerline between the pair of U-shaped stiffening plates 138. The bearing pad 146 bears against the outlet wall 36 and helps to distribute the loading when the clamp 78 is tightened down against the outlet wall 36 as will be explained below.

The lower leg 134 includes a pair of threaded fasteners or bolts 142 inserted through threaded holes 144 located near the ends of the lower leg 134. Each bolt 142 has a swivel pad 146 attached to its extremity. The threaded advancement of the bolt 142 in the threaded hole 144 causes the swivel pad 146 to make contact with the curved surface of the outlet wall 36 as shown in FIG. 4. The clamp 78 securely engages the outlet wall 36 by advancing the bolts 142 until all of the swivel pads firmly grip the outlet wall 36 with the bearing pad 140 in bearing contact with the outlet wall 36.

As shown in FIG. 4, the intermediate hanger assembly 130 includes a generally triangular-shaped plate 146 having an upper end 148 and a lower end 150. The triangular-shaped plate 146 includes a peripheral flange 152 attached to the perimeter of the triangular-shaped plate 146. The flange 152 includes a pair of holes 154 near the upper end 148 of the intermediate hanger assembly 130. The intermediate hanger assembly 130 is connected at its upper end 148 to the pair of stiffening plates 138. The pair of stiffening plates 138 include one or more holes 156 for receiving a fastening member 158, as for example a pin or threaded bolt. The holes 154 align with the holes 156 and the fastening members 158 are inserted therethrough to secure the intermediate hanger assembly 130 to the clamp 78.

Referring to FIG. 1, it may be desirable to include a plurality of holes 156 in each stiffening plate 138 to allow various positioning of the intermediate hanger assembly 130 which may be necessary due to different configurations and/or lengths of cyclone furnaces 20.

It is to be further understood that the required length of beam assembly 52 may vary depending on the size and type of cyclone furnace 20 being cleaned. Thus, it is anticipated that various lengths of beam assemblies 52 can be provided by substituting one of the beams 60, 70 or 82 with a beam of the appropriate length. Preferably, the mid beam 70 would be the substituted beam due to its simplicity relative to the front and rear beams 60 and 82, respectively, as will be explained below. Alternatively, the various lengths of beam assemblies 52 can be achieved by providing a series of mid beams differing in length by 6" and providing a plurality of shims (not shown) to be used between the crossbar 126 and the inlet flange 40, if needed.

As shown in FIG. 4, the triangular-shaped plate 146 preferably includes one or more openings 160 therethrough to reduce the weight of intermediate hanger assembly 130.

Referring to FIGS. 1 and 4, the rotational bearing assembly 120 is connected to the lower end 150 of the intermediate hanger assembly 130. A pair of opposing connecting flanges 162 are attached to the rotational bearing assembly 120. A pin 164 extends from the lower end of the intermediate hanger assembly 130 and is pin-connected to the connecting flanges 162 of the rotational bearing assembly 120.

Referring to FIGS. 1 and 4, the rotational bearing assembly 120 comprises a round tubular section 166 having a length less than the distance between the front beam 60 and the mid beam 70 in the assembled condition. The round tubular section 166 has an inside diameter greater than the outside diameter of the splice tube 92 so that the round tubular section 166 can be installed over the splice tube 92. Preferably, the round tubular section is made of steel. In the preferred embodiment, a friction reducing sleeve 168 is positioned between the round tubular section 166 and the splice tube 92. Preferably, the friction reducing sleeve is made of an ultra high molecular weight plastic.

The furnace cleaning apparatus 50 further includes an articulated arm assembly 200 attached to a trolley 202. The trolley 202 is mounted to the beam assembly 52. As shown in FIG. 2, the trolley 202 comprises a partial square tubing member 204 sized to circumscribe at least three of the four corners of the square tubing of the beam assembly 52. A bearing assembly 206, as for example a roller bearing assembly, is mounted inside the partial square tubing member 204 to enable longitudinal movement of the trolley 202 along the beam assembly 52 as indicated in FIG. 1. The trolley 202 includes a pair of end plates 208 attached to the partial square tubing member 204. A pair of side plates 210 are attached to the end plates 208 and extend from approximately the two corners of the partial square tubing member 204 which are opposite one another as shown in FIG. 2.

The trolley 202 is advanced along the beam assembly 52 by a chain drive assembly 212 as shown in FIG. 1. Referring to FIGS. 1 and 2, a front sprocket 214 is rotatably mounted within the front end 62 of the front beam 60. The front beam 60 has a cutout portion to permit the front sprocket 214 to extend beyond the periphery of the front beam 60. Referring to FIGS. 1 and 6, the rear beam 82 includes a drive sprocket 216 rotatably mounted between a pair of mounting brackets 222 in the rear beam 82. The drive sprocket 216 is connected to a drive source 218 such as a hydraulically controlled motor 218a and gearbox 218b assembly. A secondary sprocket 220 is mounted to the outside of the rear beam 82 between the pair of mounting brackets 222. The rear beam 82 includes a window 224 for allowing a chain 226 to pass from within the rear beam 82 to outside of the rear beam 82. The chain 226 passes from the drive sprocket 216 to the secondary sprocket 220 to the front sprocket 214 and then back to the drive sprocket 216 with the portion between the front sprocket 214 and the drive sprocket 216 being within the beam assembly 52 as shown in FIG. 1. The portion of the chain 226 within the beam assembly 52 passes through the splice and mid tubes 92 and 94, respectively.

The chain 226 passes through the end plates 208 of the trolley 202. The chain 226 is securely attached to the trolley 202. Preferably, the chain 226 has two ends which are each securely connected to the trolley 202. Thus, as the drive sprocket 216 rotates, the endless chain 226 moves and slides the trolley 202 longitudinally along the beam assembly 52.

Figure 3:
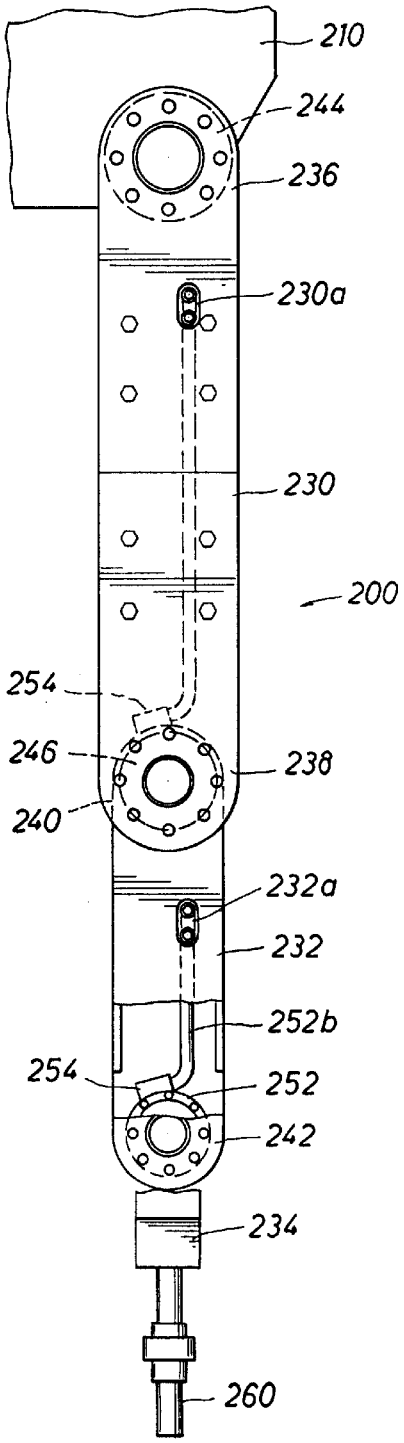
FIG. 3 is a view taken along line 3—3 of FIG. 2.

The articulated arm assembly 200 is rotatably mounted to the trolley 202 between the pair of side plates 210 as shown in FIG. 2. Referring to FIGS. 1, 2, and 3, the articulated arm assembly 200 has an elbow tube 230, a forearm tube 232, and a wrist assembly 234. The articulated arm assembly 200 is preferably fabricated from square tubing. The elbow tube 230 has a first end portion 236 and a second end portion 238. The, elbow tube end portions 236 and 238 have a pair of opposing faces removed at the location of the joint connection. The elbow tube 230 is sized so that its first end portion 236 fits within the pair of trolley side plates 210 as shown in FIG. 2. An elbow rotating means 244 is provided at the joint formed between the side plates 210 and the elbow tube 230 to provide rotational movement of the elbow tube 230 relative to the trolley 202.

The forearm tube 232 similarly has a first end portion 240 and a second end portion 242. Similarly, the forearm tube end portions 240 and 242 have a pair of opposing faces removed at the location of the joint connection. The forearm tube 232 is sized so that its first end portion 240 fits within the second end portion 238 of the elbow tube 230. A forearm rotating means 246 is provided at the joint formed between the elbow tube 230 and the forearm tube 232 to provide rotational movement of the forearm tube 232 relative to the elbow tube 230.

The wrist assembly 234 includes a pair of spaced apart wrist plates 248 connected to a tee member 250. The spaced apart wrist plates 248 fit outside of the second end portion 242 of the forearm tube 232. A wrist rotating means 252 is provided at the joint formed between the forearm tube 232 and the wrist assembly 234 to provide rotational movement of the wrist assembly 234 relative to the forearm tube 232.

It is to be understood that the articulated arm rotating means 244, 246 and 252 are preferably rotatory actuators which are commercially available components from Helac Corporation of Enumclaw, Wash. Preferably, the rotary actuators are hydraulically controlled. As shown in FIGS. 2 and 3, the rotary actuators 244, 246, and 252 preferably include direct mounted dual pilot check valves 254. A separate inlet hose and a separate outlet hose is connected to each rotatory actuator. For example, as shown in FIG. 2, the wrist rotary actuator 252 includes an inlet hose 252a and an outlet hose 252b and the forearm rotary actuator 246 includes an inlet hose 246a and an outlet hose 246b. As shown in FIG. 3, the elbow tube 230 and the forearm tube 232 include a side hose window 230a and 232a, respectively, to remove the hoses to the exterior of the articulated arm assembly 200.

Referring to FIGS. 2 and 3, the tee member 250 includes an interior bore (not shown). A nozzle assembly 260 is connected to the tee member 250. A swivel 262 is connected to the tee member 250 and in fluid engagement with the nozzle assembly 260. A fluid conduit 264 is connected to the swivel 262. The fluid conduit 264 is a flexible conduit, preferably a high pressure hose. A conduit bracket 266 is attached to a trolley side plate 210 to support the fluid conduit 264. Preferably, the fluid conduit 264 extends along the exterior of the beam assembly 52 and through the inlet opening 28 of the cyclone furnace 20. A high pressure fluid source 268 for introducing pressurized fluid, typically water, through the fluid conduit 264 and the nozzle assembly 260 is located exterior of the cyclone furnace 20.

In the preferred embodiment, the nozzle assembly 260 comprises a self-powered rotary nozzle having a rotary head with two ports. The furnace cleaning apparatus 50 will operate with a water pressure up to approximately 10,000 pounds per square inch and a flow rate of 80 gallons per minute.

The hydraulic hoses connected to the rotary actuators 244, 246, and 252 of the articulated arm assembly 200 preferably extend through the cyclone furnace 20 and exit the inlet opening 28 as partially shown in FIG. 1. The hydraulic hoses connected to the rotary actuator 122 and the drive source 218 of the beam assembly 52 similarly exit the cyclone furnace 20 at the inlet opening 28. A hydraulic power source 256 is positioned external of the cyclone furnace 20 and powers each of the rotary actuators via an external control panel 258. The external control panel controls the angular orientation of the beam assembly 52, the longitudinal positioning of the trolley 202 on the beam assembly 52, the configuration of the articulated arm assembly 200, and the direction of the nozzle assembly 260.

In the preferred embodiment of the present invention, the furnace cleaning apparatus 50 permits the cleaning of the interior of the cyclone furnace 20 in a variety of configurations and at any angle. This is illustrated by the dashed lines in FIG. 1 which show a few of the many possible configurations for cleaning the interior surface of the cyclone furnace 20. Obviously, the angle of the nozzle assembly 260 relative to the interior surface may also be manipulated to alter the angle at which the fluid jet attacks the interior surface of the cyclone furnace 20.

In the operation of the furnace cleaning apparatus 50, the operator may set the velocity of the trolley 202 along the beam assembly 52. This selection is totally independent of, and not correlated with, the oscillating movement of the trolley 202 and the beam assembly 52. The present invention offers the versatility of simultaneously permitting oscillating movement of the beam assembly 52, axial movement of the trolley 52 along the beam assembly 52, and reorientation of the articulated arm assembly 200 and nozzle assembly 260.

Preferably, the beam assembly 52 oscillates only through an angle of approximately 360° in one direction and then reverses and pivots through 360° in the other direction to minimize difficulties associated with the plurality of hoses wrapping around the beam assembly 52. It is to be understood that limit switches (not shown) may be provided with each of the rotary actuators and the drive source to limit the extent of the pivoting or oscillating movement. For example, it may be desirable to limit the oscillating movement of the beam assembly 52 to an arc of 60° in order to clean a desired portion of the cyclone furnace 20. In such a case, the limit switch restricts the rotation of the beam assembly back and forth through an arc of 60°.

Referring to FIG. 1, the articulated arm assembly 200 is illustrated in a position exterior of the cyclone furnace 20. As shown in FIG. 1, the beam assembly 52 extends beyond the outlet opening 32 of the second end wall 30 of the cyclone furnace 20. This enables the articulated arm assembly 200 to be positioned exterior of the second end wall 30 to clean the lower exterior portion thereof. The cyclone furnace 20 includes a lower opening 20a as shown in FIG. 1 to allow molten slag to escape during the combustion operations of the cyclone furnace 20. The liquid slag drains toward the opening 20a and discharges therethrough to a slag tank (not shown). Thus, to completely clean the cyclone furnace 20 it is necessary to clean the lower exterior portion of the second end wall 30 as shown in FIG. 1. The articulated arm assembly 200 has a length sufficient to allow it to reach the lower end of the cyclone furnace 20. The operator controls the configuration of the articulated arm assembly 200 and the orientation of the nozzle assembly 260 relative to the forearm tube 232 to direct the fluid spray in the desired direction. The cleaning of the second end wall 30 in a plane transverse to the articulated arm assembly 200 is accomplished by pivoting the beam assembly 52 from the control panel 258. It is important to understand that in the preferred embodiment of the present invention, the trolley 202 has no rotation relative to the beam assembly 52. Thus, as the beam assembly 52 pivots about its longitudinal axis, the trolley 202, the articulated arm assembly 200 and the nozzle assembly 260 also rotate.

The cleaning of the interior of the cyclone furnace 20 is accomplished by positioning the articulated arm assembly 200 in a generally horizontal position so as not to engage the outlet wall 36 of the outlet opening 32. The drive source 218 for the chain drive assembly 212 pulls the trolley 202 towards the rear of the beam assembly 52. During the positioning of the trolley 202 and the articulated arm assembly 200 fully within the cyclone furnace 20, the beam assembly 52 is in the angular orientation as shown in FIG. 1 so as to allow the trolley 202 to pass by the intermediate hanger assembly 130. Once the trolley 202 has fully passed beyond the intermediate hanger assembly 130, the interior cleaning of the cyclone furnace may commence.

It is anticipated that in normal cleaning operations, the articulated arm assembly 200 and the direction of the nozzle assembly 260 will be oriented for the particular area to be cleaned, and the beam assembly 52 will slowly pivot through approximately one revolution before reversing direction and pivoting back to the original position. The nozzle orientation in the articulated arm configuration can be altered at any time during the cleaning operation. The primary concern during the cleaning operations within the cyclone furnace 20 is to avoid contacting the articulated arm assembly 200 and the nozzle assembly 260 with the clamp 78 and the intermediate hanger assembly 130.

Additionally, cleaning operations can be performed by limiting the amount of oscillation of the beam assembly 52 prior to reversing its direction. This enables the operator to concentrate his cleaning operations over a certain specified area of the cyclone furnace 20. In yet another cleaning situation, it may be desirable to maintain the angular orientation of the beam assembly 52 while moving the trolley 202 along the beam assembly 52. The beam assembly 52 could thus be rotated slightly to clean an adjacent area along the length of the cyclone furnace 20. Additionally, the nozzle assembly 260 may be independently pivoted while the beam assembly 52 oscillates. Thus, the furnace cleaning apparatus 50 of the present invention provides the operator with a variety of cleaning operations which can be used to clean the cyclone furnace 20 depending on the specific circumstances and requirements.

The foregoing disclosure and description of the invention is illustrative and explanatory thereof, and various changes in the size, shape, and materials, as well as in the details of illustrative construction and assembly, may be made without departing from the spirit of the invention.

What is claimed is:

1. An apparatus for cleaning a cyclone furnace with a fluid from a fluid source, the cyclone furnace including a sidewall, a first end wall having an inlet opening, a second end wall having an outlet opening with the outlet opening defined by an outlet wall extending inwardly from the second end wall, the apparatus comprising:

a beam assembly capable of being pivotably mounted to the cyclone furnace;

means for oscillating said beam assembly;

a trolley movably mounted to said beam assembly;

means for moving said trolley relative to said beam assembly;

an articulated arm assembly mounted to said trolley;

means for pivoting said articulated arm assembly relative to said trolley;

nozzle means connected to said articulated arm assembly; and fluid conduit means for conducting fluid from the fluid source to the cyclone furnace, said fluid conduit means is connected to said nozzle means.

2. The apparatus of claim 1, wherein said beam assembly extends from the inlet opening to the outlet opening.

3. The apparatus of claim 1, further comprising intermediate beam support means for supporting said beam assembly in the interior of the cyclone furnace.

4. The apparatus of claim 3, wherein said intermediate beam support means comprises:

a clamp member capable of attaching to the outlet wall;

a rotational bearing assembly mounted to said beam assembly; and an intermediate hanger assembly having a first end and a second end, said first end attaching to said clamp member and said second end attaching to said rotational bearing assembly.

5. The apparatus of claim 1, wherein said beam assembly has a longitudinal axis and said trolley is capable of moving along said longitudinal axis of said beam assembly.

6. The apparatus of claim 1, wherein said articulated arm assembly comprises:

a plurality of arm members pivotably connected to one another; and second means for pivoting said plurality of arm members relative to one another.

7. The apparatus of claim 6, wherein said second pivoting means comprises independently controlled pivoting means for independently pivoting each said arm member.

8. The apparatus of claim 7, wherein said articulated arm assembly comprises:

a forearm member having a first end and a second end, said first end of said forearm member is connected to said trolley;

an elbow member having a first end and a second end, said first end of said elbow member is connected to said second end of said forearm member; and a wrist member having a first end and a second end, said first end of said wrist member is connected to said second end of said elbow member and said second end of said wrist member is connected to said nozzle means.

9. The apparatus of claim 1, wherein said articulated arm assembly pivoting means is capable of independently adjusting the direction of the emitted fluid spray.

10. An apparatus for cleaning a cyclone furnace with a fluid from a fluid source, the apparatus comprising:

a beam assembly capable of being pivotably mounted to the cyclone furnace, said beam assembly extending substantially through the cyclone furnace;

means for oscillating said beam assembly;

a trolley movably mounted to said beam assembly;

means for moving said trolley relative to said beam assembly;

an articulated arm assembly mounted to said trolley;

means for pivoting said articulated arm assembly relative to said trolley;

nozzle means connected to said articulated arm assembly; and fluid conduit means for conducting fluid from the fluid source to the cyclone furnace, said fluid conduit means is connected to said nozzle means.

11. The apparatus of claim 10, further comprising intermediate beam support means for supporting said beam assembly in the interior of the cyclone furnace.

12. The apparatus of claim 11, wherein said intermediate beam support means comprises:

a clamp member capable of attaching to the cyclone furnace;

a rotational bearing assembly mounted to said beam assembly; and an intermediate hanger assembly having a first end and a second end, said first end attaching to said clamp member and said second end attaching to said rotational bearing assembly.

13. The apparatus of claim 10, wherein said beam assembly has a longitudinal axis and said trolley is capable of moving along said longitudinal axis of said beam assembly.

14. The apparatus of claim 10, wherein said articulated arm assembly comprises:

a plurality of arm members pivotably connected to one another; and second means for pivoting said plurality of arm members relative to one another.

15. The apparatus of claim 14, wherein said second pivoting means comprises independently controlled pivoting means for independently pivoting each said arm member.

16. The apparatus of claim 15, wherein said articulated arm assembly comprises:

a forearm member having a first end and a second end, said first end of said forearm member is connected to said trolley;

an elbow member having a first end and a second end, said first end of said elbow member is connected to said second end of said forearm member; and a wrist member having a first end and a second end, said first end of said wrist member is connected to said second end of said elbow member and said second end of said wrist member is connected to said nozzle means.

17. The apparatus of claim 10, wherein said articulated arm assembly pivoting means is capable of independently adjusting the direction of the emitted fluid spray.

*18. An apparatus for cleaning a housing with a fluid from a fluid source, the apparatus comprising:*

*a beam assembly capable of being pivotably mounted to the housing, said beam assembly extending substantially through the housing;*

*means for oscillating said beam assembly;*

*a trolley movably mounted to said beam assembly;*

*means for moving said trolley relative to said beam assembly;*

*an arm assembly mounted to said trolley;*

*means for pivoting said arm assembly relative to said trolley;*

*nozzle means connected to said arm assembly; and*

*fluid conduit means for conducting fluid from the fluid source to the housing, said fluid conduit means is connected to said nozzle means.*

*19. The apparatus of claim 18, further comprising intermediate beam support means for supporting said beam assembly in the interior of the housing.*

*20. The apparatus of claim 19, wherein said intermediate beam support means comprises:*

*a clamp member capable of attaching to the housing;*

*a rotational bearing assembly mounted to said beam assembly; and*

*an intermediate hanger assembly having a first end and a second end, said first end attaching to said clamp member and said second end attaching to said rotational bearing assembly.*

*21. The apparatus of claim 18, wherein said beam assembly has a longitudinal axis and said trolley is capable of moving along said longitudinal axis of said beam assembly.*

*22. The apparatus of claim 18, wherein said arm assembly comprises:*

*a plurality of arm members pivotably connected to one another; and*

*second means for pivoting said plurality of arm members relative to one another.*

*23. The apparatus of claim 22, wherein said second pivoting means comprises independently controlled pivoting means for independently pivoting each said arm member.*

*24. The apparatus of claim 23, wherein said arm assembly comprises:*

*a forearm member having a first end and a second end, said first end of said forearm member is connected to said trolley;*

*an elbow member having a first end and a second end, said first end of said elbow member is connected to said second end of said forearm member; and*

*a wrist member having a first end and a second end, said first end of said wrist member is connected to said second end of said elbow member and said second end of said wrist member is connected to said nozzle means.*

*25. The apparatus of claim 18, wherein said arm assembly pivoting means is capable of independently adjusting the direction of the emitted fluid spray.*

*26. A method for cleaning the interior of a housing with a fluid from a fluid source using a beam assembly having a longitudinal axis which supports a trolley, an arm assembly pivotally attached to the trolley, and a nozzle connected to the arm assembly, the method comprising the steps of:*

*inserting the beam assembly into the housing;*

*supporting the beam assembly within the housing;*

*spraying fluid from the fluid source through the nozzle onto the interior surface of the housing; and*

*oscillating the beam assembly along its longitudinal axis thereby moving the nozzle in a plane substantially perpendicular to the longitudinally axis of the beam assembly.*

*27. The method of claim 26 further comprising the step of displacing the trolley along the longitudinal axis of the beam assembly.*

*28. The method of claim 26 further comprising the step of pivoting the arm assembly about the trolley in a plane substantially parallel with the longitudinally axis of the beam assembly.*

*29. A method for cleaning the interior of a housing with a fluid from a fluid source using a beam assembly having a longitudinal axis which supports a trolley, an arm assembly pivotally attached to the trolley, and a nozzle connected to the arm assembly, the method comprising the steps of:*

*inserting the beam assembly into the housing;*

*supporting the beam assembly within the housing;*

*spraying fluid from the fluid source through the nozzle onto the interior surface of the housing;*

*oscillating the beam assembly along its longitudinal axis thereby moving the nozzle in a plane perpendicular to the longitudinally axis of the beam assembly;*

*displacing the trolley along the longitudinal axis of the beam assembly; and*

*pivoting the arm assembly about the trolley in a plane substantially parallel with the longitudinal axis of the beam assembly.*

* * * * *